United States Patent
Kaiser

[15] 3,669,404
[45] June 13, 1972

[54] CLOSURE DEVICE ON A PIPE CONDUIT

[72] Inventor: Friedrich Kaiser, Mannedorf, Switzerland

[73] Assignee: Escher Wyss Limited, Zurich, Switzerland

[22] Filed: March 19, 1970

[21] Appl. No.: 21,080

[30] Foreign Application Priority Data

March 20, 1969 Switzerland ..................... 4357/69
April 15, 1969 Switzerland ..................... 5788/69

[52] U.S. Cl. .......................... 251/172, 251/175, 251/315
[51] Int. Cl. ......................................................... F16k 25/00
[58] Field of Search ............... 251/177, 172, 173, 175, 315

[56] References Cited

UNITED STATES PATENTS

| | | | |
|---|---|---|---|
| 2,547,831 | 4/1951 | Mueller | 251/175 |
| 2,789,785 | 4/1957 | Woods | 251/173 X |
| 2,913,218 | 11/1959 | Broz | 251/173 |
| 3,014,690 | 12/1961 | Boteler | 251/171 UX |
| 3,077,331 | 2/1963 | Burtis | 251/173 |
| 3,020,019 | 2/1962 | Fawkes | 251/175 |
| 3,408,037 | 10/1968 | Kaiser | 251/175 |

FOREIGN PATENTS OR APPLICATIONS

| | | | |
|---|---|---|---|
| 634,185 | 11/1927 | France | 251/172 |
| 458,856 | 4/1928 | Germany | 251/172 |

Primary Examiner—Harold W. Weakley
Attorney—Dodge & Ostmann

[57] ABSTRACT

A rotary valve to be mounted in a pipe conduit and including an elastically yieldable packing cylinder fixed at one end by means of a short radial collar confined between the housing and a section of said conduit, and an annular sealing seat fixed to the rotatable ball member. The packing cylinder is arranged in a counterbore formed in the walls of said housing, and covers a space in said counterbore. The space, in the closed position of said closure member, being brought under liquid pressure so as to press the free end of said packing cylinder onto said seat.

1 Claim, 2 Drawing Figures

3,669,404

INVENTOR.
FRIEDRICH KAISER
BY
Dodge + Ostmann
Attorneys

CLOSURE DEVICE ON A PIPE CONDUIT

BACKGROUND OF THE INVENTION

The invention relates to a valve device in a pipe conduit, comprising a housing and a rotary valve member rotatably arranged. An elastically yieldable packing cylinder is provided for sealing off the rotary valve member in the closed position, said cylinder having at its free end an annular sealing surface and yielding elastically to such an extent in the closed position of the rotary valve member under load by liquid pressure that this sealing surface is caused to bear on a rigid, annular sealing seat formed on the rotary ball member.

A valve device of this type is known, in which the elastically yieldable annular packing cylinder is arranged on the rotatable rotary valve member and co-operates with a rigid sealing seat provided in the housing.

SUMMARY OF THE INVENTION

By contrast thereto, the invention consists in that the rigid sealing seat is arranged on the rotary valve member and the elastically yieldable packing cylinder is arranged in a counterbore formed in the housing. The cylinder is provided with a narrow collar at one end which is confined between the valve housing and conduit section 2, and with the annular sealing surface on the free end. In addition the packing cylinder, in conjunction with the wall, defines an annular space for accommodating the liquid under pressure serving to load the packing cylinder.

By this arrangement and as compared with the known closure device, a simplification in construction is produced, and it is unnecessary that the liquid under pressure serving to load the packing cylinder be conducted from a fixed position into the rotatable rotary valve member.

BRIEF DESCRIPTION OF THE DRAWING

Constructional examples of a valve device according to the invention are shown in simplified form in the drawing, wherein.

Components which correspond to one another bear the same references in all figures.

DESCRIPTION OF THE PREFERRED EMBODIMENTS

Figure 1:
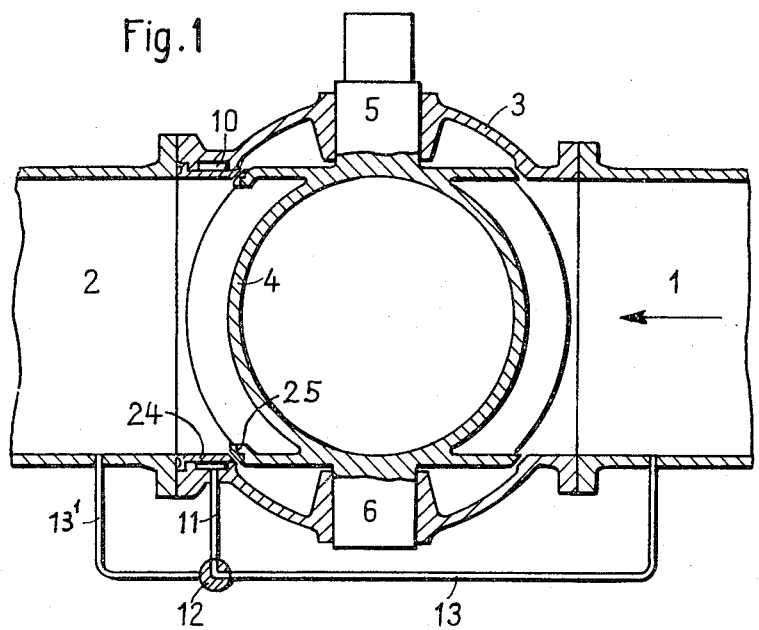
FIG. 1 is an axial section through a valve device with a sealing system on the downstream side.

According to FIG. 1, a ball valve is installed between an upstream section 1 and a downstream section 2 of a pipe conduit, for example, the pressure pipe of a hydraulic power station, to serve as a closure device, said valve comprising a housing 3 and a ball member 4. The latter is rotatably mounted by means of two pivots 5 and 6 in the housing 3. The ball member 4 comprises a tubular portion, which extends coaxially of the pipe conduit in the open position and thus permits the unobstructed throughflow of water through the pipe conduit, but in the closed position as shown in the drawing, the said portion is disposed transversely of the axis of the pipe conduit.

An elastically yieldable packing cylinder 24 bears with a sealing action on a single annular zone 9 and provides a sealing system on the downstream side of the valve. The elastically yieldable packing is constructed as a thin-walled hollow cylinder 24, which is connected fast to the wall formed by the housing 3 and the section 2 on its end remote from the sealing surface 25. For this purpose, the packing cylinder 24 comprises a collar 26 on the outside at its end remote from the sealing surface 25, which collar 26 is clamped between the two adjoining connecting flanges of the housing 3 and the section 2 of the pipe conduit. The dimensions of the packing ring 24 are so established that the stressing which occurs in operation does not exceed the elastic limit.

Figure 2:
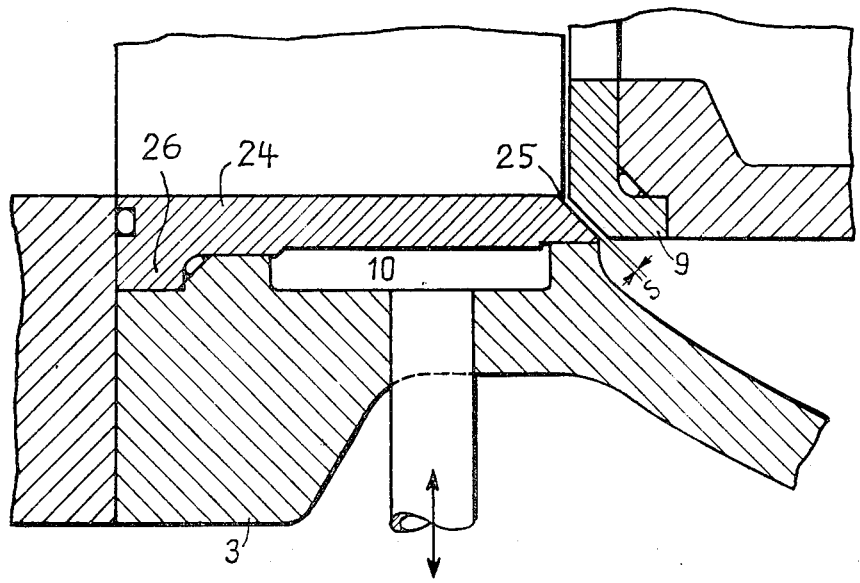
FIG. 2 shows the sealing system thereof to a larger scale.

If the valve device is to be opened, the annular space 10 is connected to the downstream side by rotating the three-way cock 12 and thus is relieved of water pressure. The pressure applied to the packing cylinder 24 disappears and the sealing surface 25 is lifted, by virtue of the elasticity of the cylinder 24, away from the sealing seat 9 to such a degree that a very slight clearance s (see FIG. 2) is established, this being sufficient in order to be able to turn the closure member 4 into its open position.

I claim:

1. A rotary valve in a pipe conduit, having a housing; said pipe conduit having an upstream section and a downstream section, each of said conduit sections connected to said housing; a valve member mounted for rotation in said housing and having a tubular opening therethrough, said opening being aligned with said sections when the valve is open; an elastically yieldable, thin-walled tubular packing element; a narrow collar projecting radially from the outer surface of said packing element adjacent its downstream end, said collar being confined between said valve housing and said downstream conduit section; an annular sealing seat fixed to said valve member; an annular sealing surface formed on the upstream end of said element; a pressure chamber defined between the outer surface of said element and said housing; and means for selectively delivering, fluid under pressure to said chamber or venting fluid therefrom so that, in the closed position of said valve member, fluid under pressure in said chamber will press said sealing surface onto said sealing seat.

* * * * *